US009529185B2

(12) United States Patent
Fiedler (10) Patent No.: US 9,529,185 B2
(45) Date of Patent: Dec. 27, 2016

(54) FAR-OPTICAL DEVICE

(71) Applicant: Swarovski-Optik KG., Absam (AT)

(72) Inventor: Albert Fiedler, Absam (AT)

(73) Assignee: Swarovski-Optik KG. (AT)

( * ) Notice: Subject to any disclaimer, the term of this patent is extended or adjusted under 35 U.S.C. 154(b) by 15 days.

(21) Appl. No.: 14/305,849

(22) Filed: Jun. 16, 2014

(65) Prior Publication Data

US 2014/0293413 A1  Oct. 2, 2014

Related U.S. Application Data

(63) Continuation of application No. 13/234,705, filed on Sep. 16, 2011, now Pat. No. 8,786,947, which is a continuation of application No. 12/793,073, filed on Jun. 3, 2010, now Pat. No. 8,054,544, which is a continuation of application No. 11/453,983, filed on Jun. 16, 2006, now Pat. No. 7,742,228.

(30) Foreign Application Priority Data

Jul. 20, 2005 (AT) .................................. A 1220/2005

(51) Int. Cl.
G02B 23/00 (2006.01)

(52) U.S. Cl.
CPC ............. *G02B 23/00* (2013.01); *G02B 23/145* (2013.01)

(58) Field of Classification Search
None
See application file for complete search history.

(56) References Cited

U.S. PATENT DOCUMENTS

| 1,464,655 | A | 8/1923 | Jacob |
| 2,207,124 | A | 7/1940 | Kollmorgen |
| 2,479,792 | A | 8/1949 | Tackaberry |
| 3,045,545 | A | 7/1962 | Korones et al. |
| 3,161,716 | A | 12/1964 | Burris et al. |
| 3,384,434 | A | 5/1968 | Skidmore et al. |
| 3,645,602 | A | 2/1972 | Clave et al. |
| 3,967,876 | A | 7/1976 | Steck, III |
| 4,172,634 | A | 10/1979 | Thompson |
| 4,249,793 | A | 2/1981 | Uehara |
| 4,286,844 | A | 9/1981 | Nagler |

(Continued)

FOREIGN PATENT DOCUMENTS

| AT | 31994 T | 1/1988 |
| AT | 59149 T | 1/1991 |

(Continued)

OTHER PUBLICATIONS

David M. Fortier, "Scoping AR Optics" Aug. 30, 2005, America's Rifle—Book of the AR-15.

(Continued)

*Primary Examiner* — Stephone B Allen
*Assistant Examiner* — James McGee
(74) *Attorney, Agent, or Firm* — Lerner, David, Littenberg, Krumholz & Mentlik, LLP (57) ABSTRACT

A far-optical device comprising a reversal system and an adjustable optical magnification means with more than four-fold magnification, wherein the far-optical device has an optical beam deflection means which at all magnifications ensures a subjective field of view of the far-optical device of at least 22° at least for light of a wavelength of about 550 nm.

10 Claims, 8 Drawing Sheets

(56) References Cited

U.S. PATENT DOCUMENTS

| | | | |
|---|---|---|---|
| 4,408,842 | A | 10/1983 | Gibson |
| 4,497,548 | A | 2/1985 | Burris |
| 4,530,812 | A | 7/1985 | Perkins et al. |
| 4,743,028 | A | 5/1988 | Harrison |
| 5,109,596 | A | 5/1992 | Driller et al. |
| 5,500,769 | A | 3/1996 | Betensky |
| 5,548,439 | A | 8/1996 | Smith |
| 5,671,088 | A | 9/1997 | Mai et al. |
| 5,727,236 | A | 3/1998 | Frazier |
| 6,226,122 | B1 | 5/2001 | Sugawara et al. |
| 6,367,189 | B1 | 4/2002 | Clay |
| 6,577,449 | B1 * | 6/2003 | Kanai ............... G02B 15/163 359/421 |
| 7,684,114 | B2 | 3/2010 | Thomas |
| 2006/0016887 | A1 | 1/2006 | Faulk |
| 2006/0262391 | A1 | 11/2006 | Thomas |

FOREIGN PATENT DOCUMENTS

| | | |
|---|---|---|
| DE | 67823 | 1/1892 |
| DE | 198489 C | 11/1905 |
| DE | 252732 C | 8/1911 |
| DE | 975486 C | 12/1961 |
| DE | 2024578 A1 | 1/1971 |
| DE | 3833633 A1 | 7/1989 |
| DE | 3838413 A1 | 5/1990 |
| DE | 19853644 A1 | 5/1999 |
| GB | 19446 | 0/1913 |
| GB | 191321621 A | 0/1913 |
| GB | 690278 A | 4/1953 |
| JP | 11-326789 A | 11/1999 |
| WO | 2006081411 A2 | 8/2006 |

OTHER PUBLICATIONS

Dr. Helmut Naumann, Wilhelm Knapp-Verlag, "Optik für Konstrukteure" (1960). (English translation of description only.).
Dr. L. C. (Vem) Clune, "Optical performance of Reimaging Wide Field-Cf-View (FOV) Telescope", SPIE vol. 643 Infrared, Adaptive, and Synlhetic Aperture Optical Systems (1986), Apr. 1, 1986, pp. 114-120, XP002044198.
Herbert Gross, "Handbook of Optical Systems", vol. 4, Wiley—VCH (2008). pp. 127, 128, and 153.
International Standards, ISO 14132-1:2002 (2002).
International Standards, ISO 14132-3:2002 (2002).
International Standards, ISO 14133-2:2006 (2002).
International Standards, ISO 14135-2:2003 (2002).
John B. Williams, "United States Optics Technologies", 2002, Custom Engineering Catalog.
John Dunn, "Improved binocular design gives users a wider view", The Engineer, London, GB, May 21, 1992, p. 36, XP002044199.
Larousse Dictionary of Science dz Technology (1995), "Barlow Lens", Seite 90.
Lu et al., New Type of Large-angle Binocular Microtelescopes, Current Developments in Optical Design and Optical Engineering, vol. 1527, pp. 413-418, 1991.
Lu Kalchang et al., New type of large-angle binocular microtelescopes, SPIE vol. 1527 Current Developments in Optical Design and Optical Engineering (1991), pp. 413-41 8, XP002404670.
Michael Bass, "Handbook of optics", 1995, McGraw-Hill, Inc., USA, pp. 2.4-211 XP002404673.
Smith, Modern Optical Engineering; The Desing of Optical Systems, Second Edition, 241-250 (1990).
Springer-Verlag, "Die Fernrohre und Entfernungsmesser" (1959). (English translation of abstract only.).
Test methods for telescopic systems; part 1: Test methods for basic characteristics, 2005, 19 pages.
Weaver 2003 Outdoor Optics Catalogue (pp. 1-15).
Weaver Outdoor Optics Catalog, 2003, pp. 1-15.
Weaver-Scoped for 1978, Optics and optical instruments.
Weaver-Scopes for 1978, Optics and optical instruments—Test methods for telescopic systems; part 1: Test methods for basic charactersitcs, 2005, 21 pages.
Wikipedia: Achromatic Lens, May 2011.
Wikipedia: Barlow Lens, Jun. 2011.
Zeiss Rifle Telescopes, advertising brochure (1920).
Zeiss, Diavari VM/V-series Advetising Brochure. (Translation of description only), 2011.
Zeiss, ZM/Z-Zielfernorohre Advetising Brochure. (Translation of description only), 2011.

* cited by examiner

FAR-OPTICAL DEVICE

This application is a continuation of U.S. application Ser. No. 13,234,705, filed Sep. 16, 2011, which is a continuation of U.S. application Ser. No. 12,793,073, filed Jun. 3, 2010, which is a continuation of U.S. application Ser. No. 11/453,983, filed Jun. 16, 2006, which claims priority from Austrian Patent Application No. A1220/2005 filed Jul. 20, 2005, the disclosures of which are incorporated herein by reference.

The present invention relates to a far-optical device, in particular a telescope or aiming telescope, comprising a reversal system and an adjustable optical magnification means with more than fourfold magnification.

If an object at a great distance is viewed with the naked eye it appears at a small angle. The purpose of any far-optical device is to magnify that small angle. The far-optical device therefrom provides that an appearance angle which is as large as possible can pass into the eye of the viewer. At the same time it should be possible to overlook a piece of territory which is as large as possible.

In the case of zoomable far-optical devices of the general kind set forth, involving an adjustable magnification, it is particularly critical to be able to overlook a piece of territory which is as large as possible, over the entire magnification range.

The object of the invention is to improve far-optical devices of the general kind set forth, in that respect.

In accordance with the invention that is achieved in that the far-optical device has an optical beam deflection means which at all magnifications ensures a subjective field of view of the far-optical device of at least 22°, preferably between 22° and 24°, at least for light of a wavelength of about 550 nm.

By means of the optical beam deflection means, it is now possible to afford a subjective field of view of at least 22°, even at low levels of magnification, in particular at the lowest magnification, of the far-optical device. That was possible hitherto only at relatively high levels of magnification of far-optical devices of the general kind set forth. Accordingly, even at low levels of magnification, by means of the far-optical device according to the invention, the viewing person sees a larger piece of territory than the state of the art hitherto permitted.

In accordance with a further aspect of the invention the specified object is also attained if it is provided that the beam deflection means at the maximum magnification ensures a total focal length of the reversal system of between 11 mm and 7 mm, preferably between 10 mm and 8 mm.

Further details and features of the invention are explained with reference to the Figures described hereinafter, in which.

Figure 1:
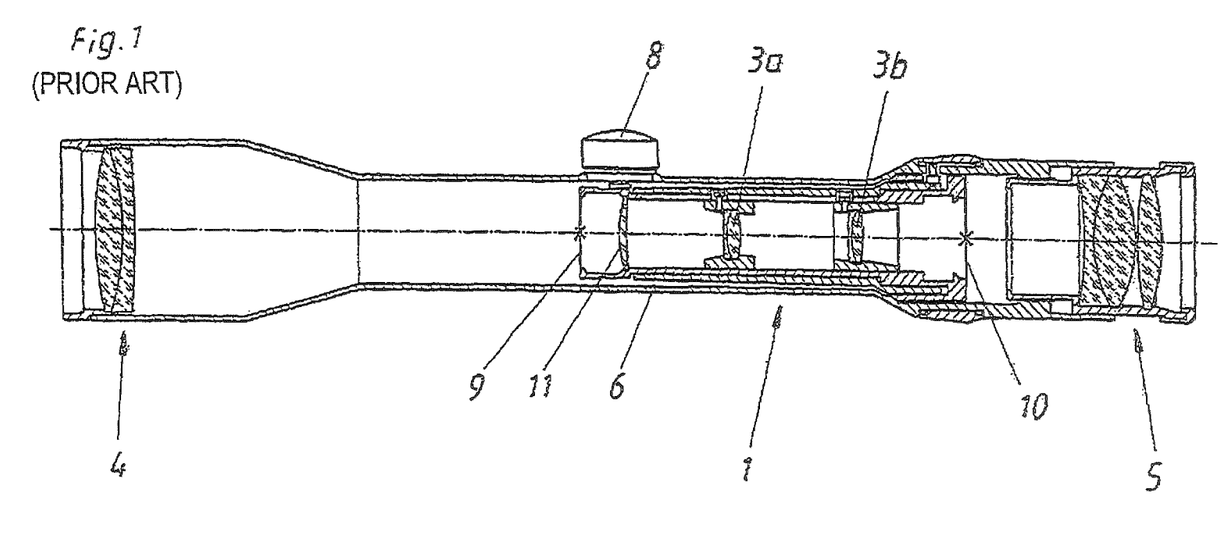
FIG. 1 shows a longitudinal section through an aiming telescope in accordance with the state of the art, FIGS. 2a to 2c each show a section through a reversal system in accordance with the state of the art, FIGS. 3a to 3c each show a section through a reversal system for an embodiment according to the invention of an aiming telescope.

FIG. 1 diagrammatically shows a section through an aiming telescope or telescopic sight in accordance with the state of the art. On the side towards the object when viewing, the telescope has a lens arrangement which is referred to hereinafter as the objective 4 while on the side towards the eye of the viewer it has a lens system identified as the eyepiece 5. Disposed between the objective 4 and the eyepiece 5 is the central tube 6. It frequently carries one or more adjusting towers 8 with which various adjustment functions known in the state of the art can be carried out. Disposed within the central tube between the objective 4 and the eyepiece 5 is the reversal system 1. That is an optical system which is known in the state of the art and which serves to make the image produced by the objective 4 upright. The reversal system 1 is generally arranged between the objective-side image plane 9 and the eyepiece-side image plane 10. In addition the reversal system 1 frequently serves not only for making the image upright but also for magnifying the intermediate image produced in the objective-side image plane 9. In the aiming telescope shown in FIG. 1 the optical magnification means is integrated into the reversal system 1. The optical magnification means and the reversal system are thus provided in one component.

Two optical elements 3a and 3b are provided for magnifying the image and making it upright. In general these involve achromatic elements which for controlling chromatic aberration are desirably in the form of what are referred to as cemented lenses, that is to say lens arrangements which are bonded together. In the state of the art as also in the case of reversal systems or far-optical devices in accordance with the invention they appropriately have refractive powers of +20 dpt (dioptres) up to +53 dpt, preferably from +21 dpt to +35 dpt, particularly preferably in the range between +23 dpt and +26 dpt. In order to make the magnification of the illustrated aiming telescope adjustable, the optical elements 3a and 3b are movable along control grooves. Displacement of the optical elements 3a and 3b means that the intermediate image produced by the objective 4 in the objective-side image plane 9 is produced, with the changing imaging scale and in an upright position, in the eyepiece-side image plane 10. In the illustrated embodiment the spacing of the two image planes 9 and 10 is not changed by the displacement of the optical elements 3a and 3b. In the state of the art moreover it was also known additionally also to provide a field lens 11. That helps to pass the beam of rays, coming from the objective 4, of an object point at the edge of the field of view, through the narrow passage of the central tube 6 and the reversal system 1 respectively.

Figure 2A:
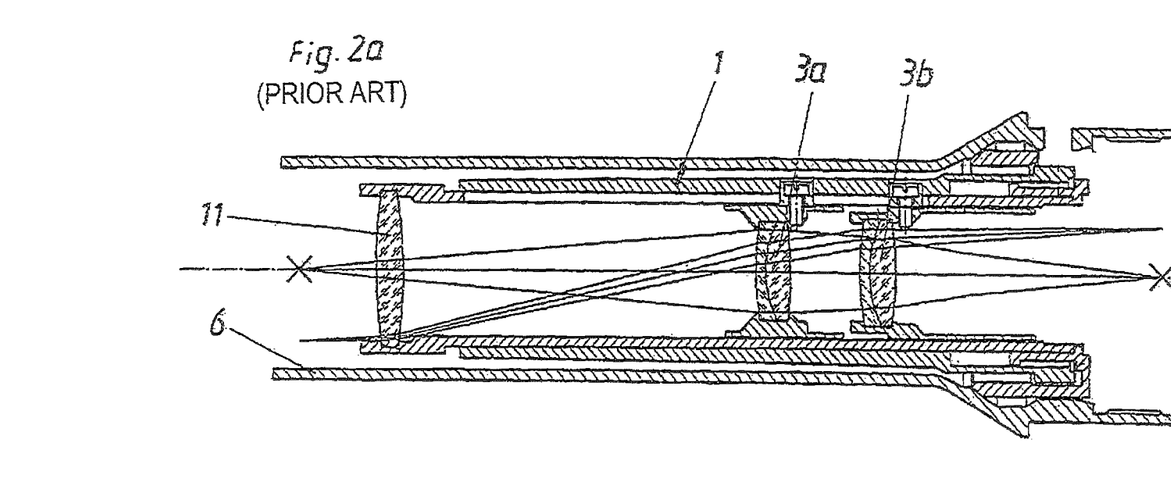
Figure 2B:
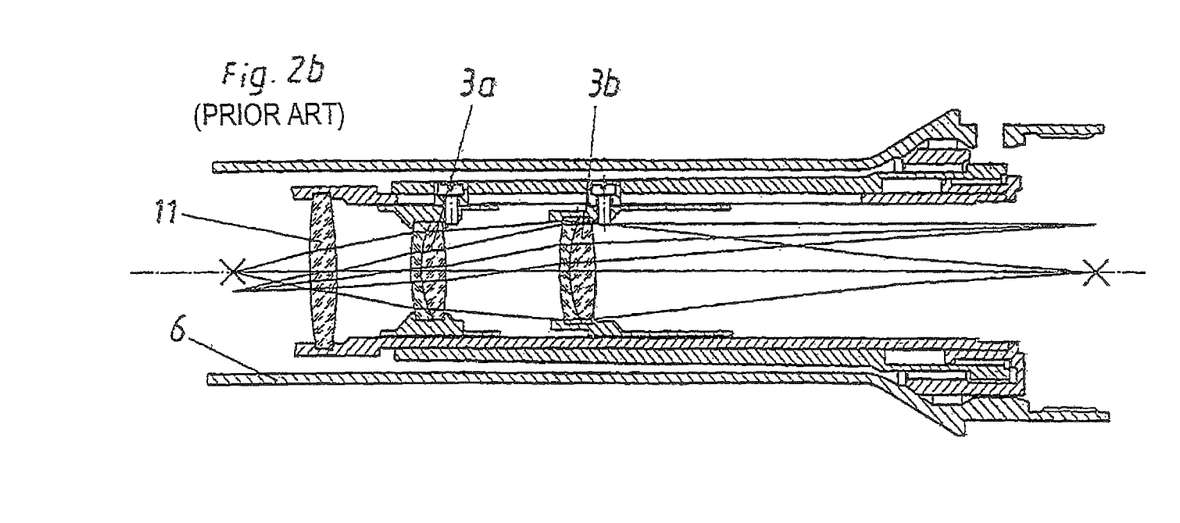
Figure 2C:
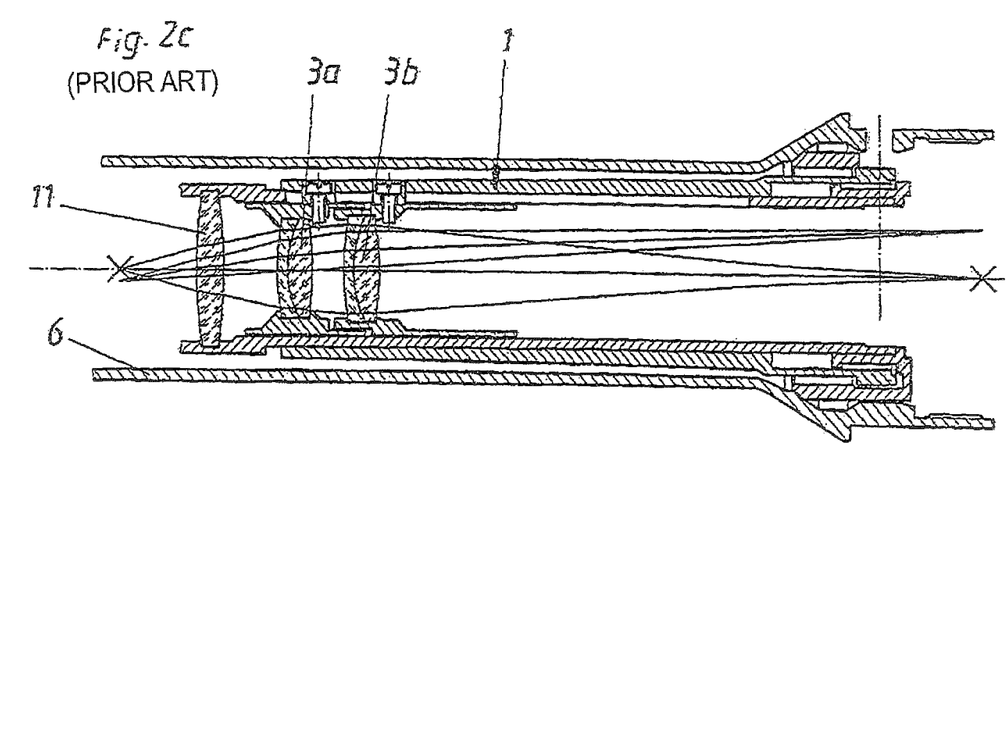

The change in the imaging scale by movement of the optical elements 3a and 3b along control grooves (not further shown in detail here) is known in the state of the art. FIGS. 2a to 2c show the positions of the optical elements 3a and 3b at different levels of magnification. The position shown in FIG. 2a provides for example single magnification. In the position shown in FIG. 2b the reversal system 1 produces a magnification by 2.5 times while in the position shown in FIG. 2c it produces magnification by 4 times.

Figure 3A:
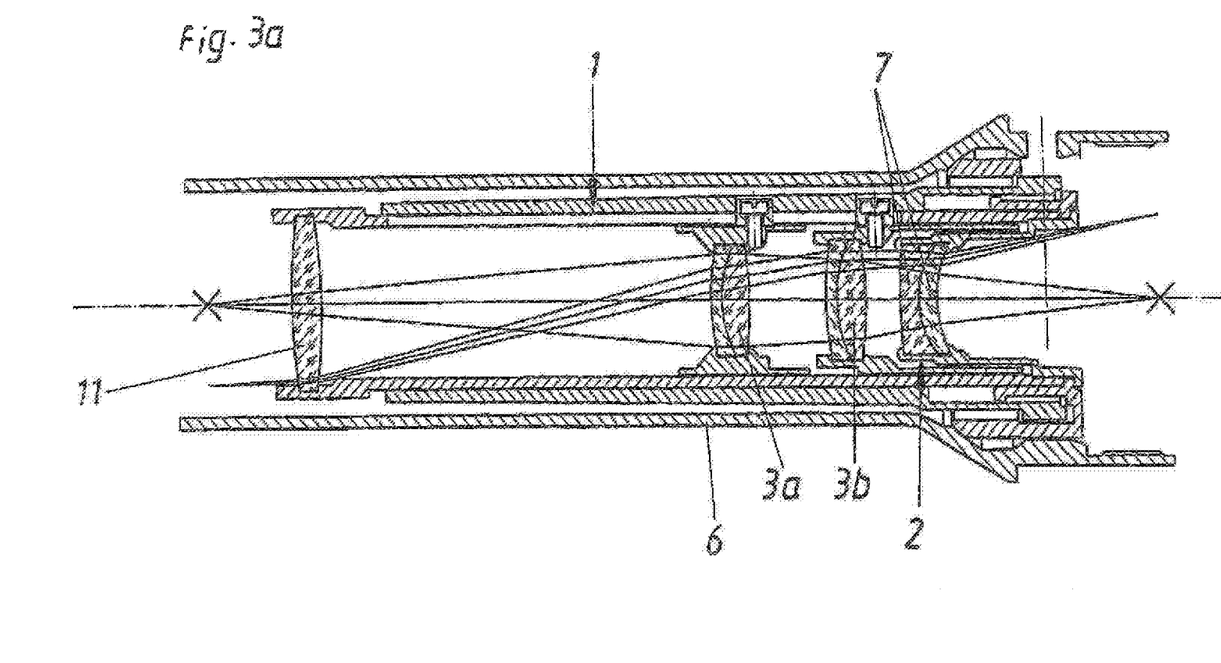
Figure 3B:
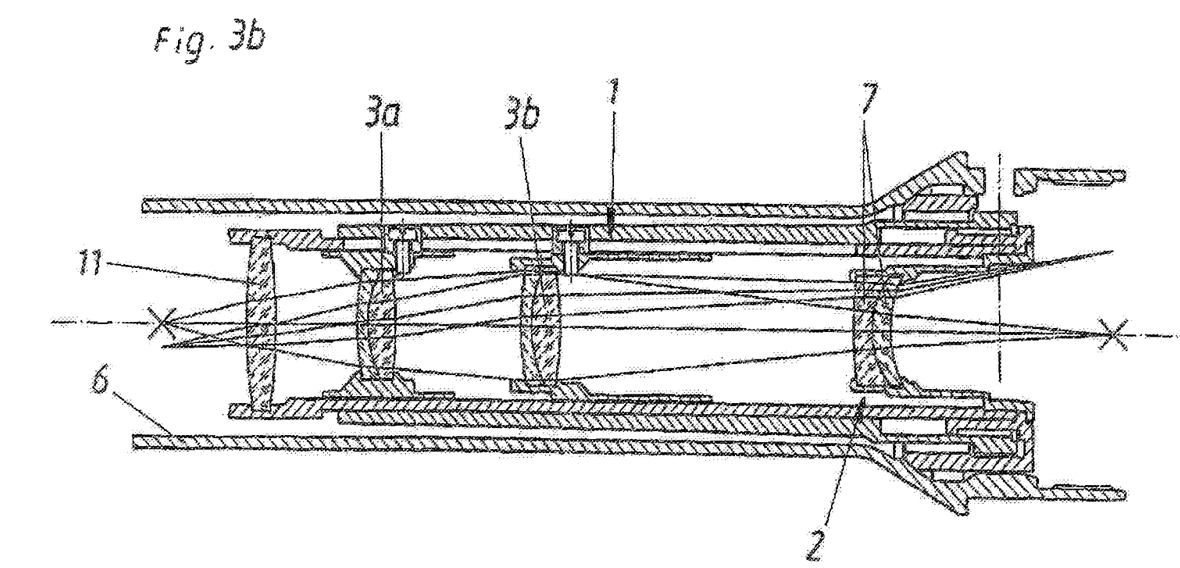
Figure 3C:
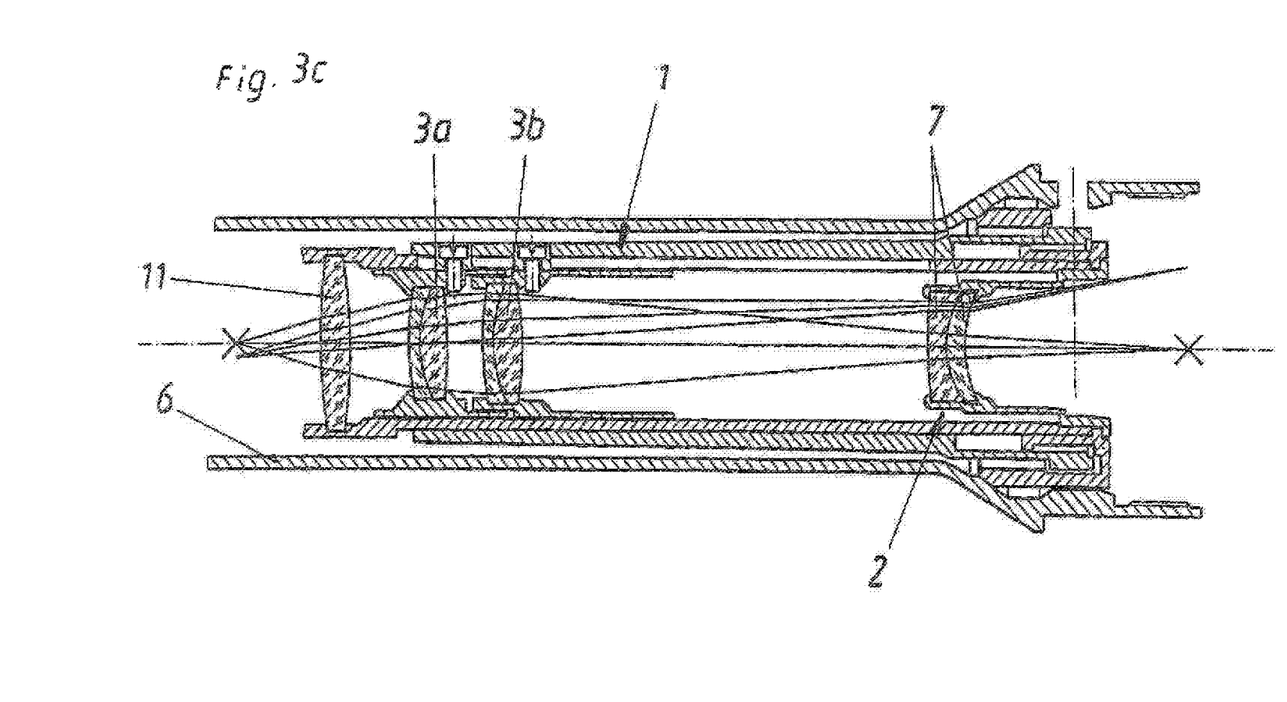

In order now to be able to ensure a subjective field of view of at least 22° in a far-optical device with a maximum magnification or a maximum zoom of greater than four times, even at low levels of magnification, the invention provides an optical beam deflection means 2. That is shown in an embodiment in FIGS. 3a to 3c and is here integrated in the form of an additional lens arrangement in the reversal system 1. The reversal system 1 according to the invention as shown in FIGS. 3a to 3c can be integrated for example in place of the reversal system 1 shown therein, in an aiming telescope as shown in FIG. 1.

The optical beam deflection means 2 however can equally well be arranged in the form of a separate component, separately from the reversal system 1, in the far-optical device. On the other hand however it is also possible for the optical beam deflection means 2 according to the invention to be embodied by a suitable configuration of the lenses 11, 3a and 3b. It is desirably provided that the optical beam deflection means ensures the subjective field of view of at least 22°, preferably between 22° and 24°, in relation to an optical magnification means, preferably of the reversal system, with an at least fivefold and preferably at an at least sixfold, maximum magnification, at all magnification stages. For better control of chromatic aberration it has been found to be appropriate for the optical beam deflection means 2 to have preferably two lenses 7 which are bonded together, that is to say cemented lenses. It would however also be conceivable for the optical beam deflection means 2 to be in the form of an individual lens.

It has proven to be desirable for the optical beam deflection means 2 to be arranged on the side of the reversal system 1, which faces towards the eyepiece 5. In that respect positioning on the side of the eyepiece-side image plane 10, which faces away from the eyepiece 5, is advantageous.

A solution which is structurally particularly simple provides that the optical beam deflection means 2 is arranged fixedly, that is to say not movably with respect to the central tube 6. In certain embodiments however it has also proven to be necessary for the optical beam deflection means 2 to be designed to be movable, that is to say generally displaceable along the optical axis.

Hitherto, in current aiming telescopes, the central tube is of an outside diameter of between 30 mm and 35 mm. That is naturally reckoned without any adjusting towers 8 or the like which may be present. That dimension for the central tube 6 is desirably also retained in the case of aiming telescopes according to the invention.

In general it is desirable for the optical beam deflection means 2 to have a refractive power of between −20 dpt (dioptres) and −40 dpt, preferably between −27 dpt and −37 dpt. In a specific example, the refractive power provided is −27.03 dpt, in which case a subjective field of view of 23.5° is achieved at all levels of magnification.

FIGS. 3a to 3c again show the reversal system 1 according to the invention in three different positions of the optical elements 3a and 3b provided for magnification and reversal of the image. The position in FIG. 3a involves for example single magnification. FIG. 3b shows the positioning with a magnification of 3.5 times and FIG. 3c shows positioning at a magnification of six times. The optical beam deflection means 2 provides for an increase in the size of the subjective field of view by beam deflection. In that way, in accordance with the invention, at all levels of magnification it is possible to achieve a subjective field of view of at least 22° or at the maximum magnification a total focal length of smaller than or equal to 11 mm. By virtue of the beam deflection means 2, at the maximum magnification, the total focal length of the reversal system 1 according to the invention is desirably between 11 mm and 7 mm, preferably between 10 mm and 8 mm. In the specific embodiment mentioned a total focal length of 8.264 mm was achieved, at the maximum magnification.

Figure 4:
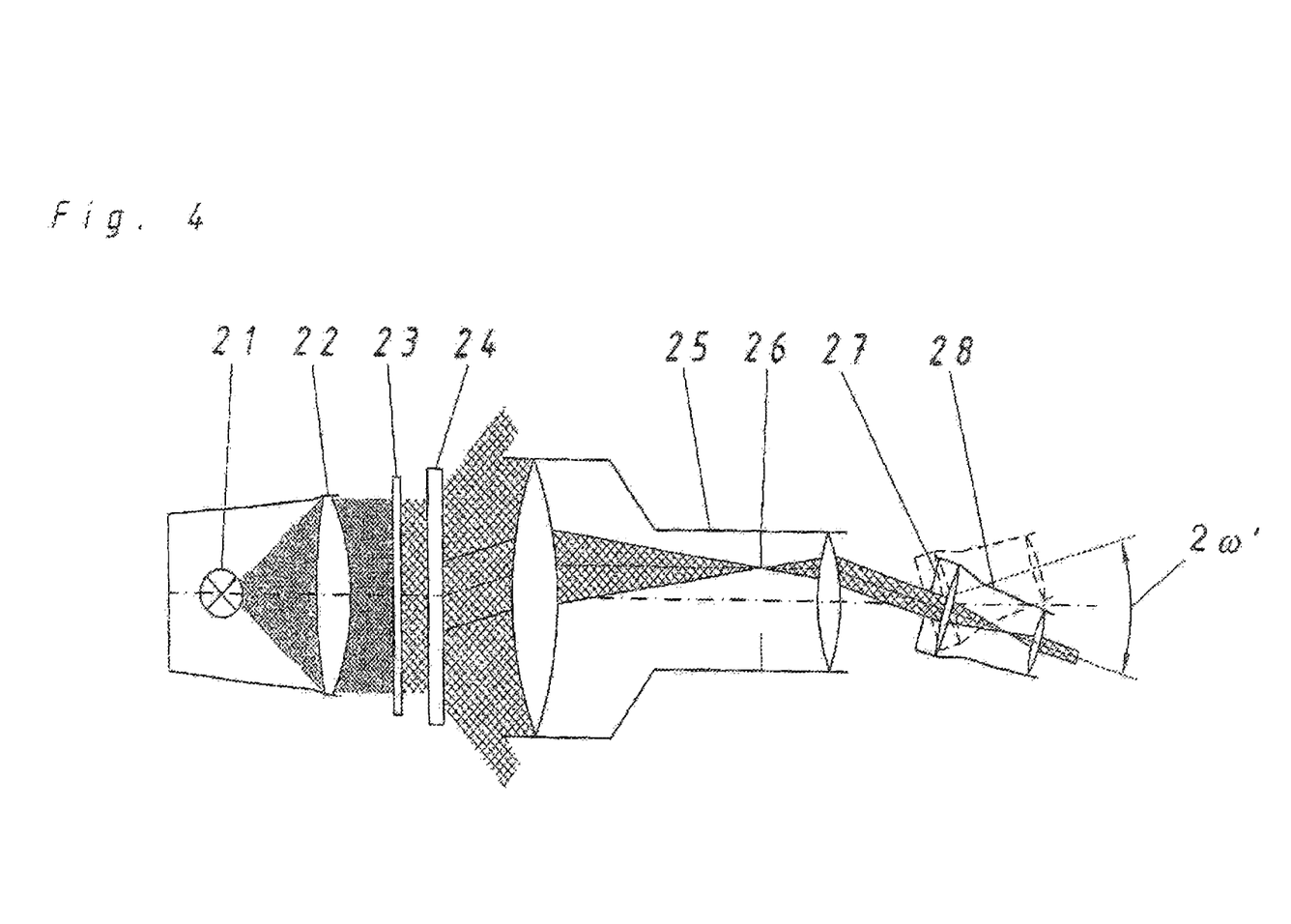
FIG. 4 shows a diagrammatic measurement structure for determining the subjective field of view.

The size of the subjective field of view 2 ω' is determined by means of angle measurement. The corresponding measurement structure for testpieces with a real exit pupil is shown in FIG. 4. On the eyepiece side of the testpiece 25 an auxiliary telescope 28 is mounted on a turntable with an angle measurement device. In that respect an auxiliary telescope 28 with approximately threefold magnification, a diameter for the entry pupil of about 3 mm and an arrow mark such as for example a crosshairs was to be used. To avoid colour fringes in the image green light of a wavelength of about 550 nm is used for the measurement procedure. The measurement structure provides a sequence comprising a light source 21, a condenser 22, a filter 23, a diffusing screen 24, a far-optical device (testpiece) 25 to be tested, a field of view stop 26 and an auxiliary telescope 28 on the position 27 of the exit pupil. To carry out the measurement procedure the pivot axis of the auxiliary telescope 28 is at the location of the exit pupil 27 and in the plane of the entry pupil of the auxiliary telescope. The pivot axis intersects the optical axis of the testpiece 25 and that of the auxiliary telescope 28 at a right angle. The auxiliary telescope 28 which is set at an acute angle in relation to the field of view stop 26 of the testpiece 25 is to be pivoted in order to move the arrow mark thereof successively to mutually opposite edges of the field of view. The angular difference is to be read off at the scale of the angle measurement device of the pivotal table (in degrees).

Measurement of the total focal length of a reversal system is effected in accordance with DIN 58189 (issued in May 1996) and can be carried out with commercially available testing apparatuses.

The invention claimed is:

1. A far-optical device comprising:
an objective lens and an eyepiece lens;
a reversal system, wherein the reversal system is arranged between an objective-side image plane and an eyepiece-side image plane,
wherein the reversal system is for magnifying an intermediate image produced in the objective-side image plane, and
wherein the reversal system has two optical elements with positive refractive powers, wherein said two optical elements are movable relative to each other, so that said intermediate image produced by the objective lens in the objective-side image plane is produced, with a changeable imaging scale and in an upright position, in the eyepiece-side image plane; and
an optical beam deflection means disposed on a side of the reversal system facing the eyepiece lens, wherein the optical beam deflection means is arranged fixedly with respect to the reversal system and is arranged on a side of the eyepiece-side image plane which faces away from the eyepiece lens, such that at all magnifications of the far-optical device a subjective field of view of the far-optical device is at least 22°,
wherein a maximum value of the changeable imaging scale is greater than four times.

2. The far-optical device according to claim 1, wherein the maximum value of the changeable imaging scale is at least fivefold.

3. The far-optical device according to claim 1, wherein the maximum value of the changeable imaging scale is at least sixfold.

4. The far-optical device according to claim 1, wherein at a maximum magnification of the far-optical device a total focal length for the reversal system is at most 11 mm.

5. The far-optical device according to claim 1, wherein the optical beam deflection means at a maximum magnification ensures a total focal length for the reversal system of between 11 mm and 7 mm.

6. The far-optical device according to claim 1, wherein the optical beam deflection means at a maximum magnification ensures a total focal length for the reversal system of between 10 mm and 8 mm.

7. The far-optical device according to claim 1, wherein the optical beam deflection means has a refractive power of between −20 dpt and −40 dpt.

8. The far-optical device according to claim 1, wherein the optical beam deflection means has a refractive power of between −27 dpt and −37 dpt.

9. The far-optical device according to claim 1, having a central tube disposed between the objective lens and the eyepiece lens and the central tube having an outside diameter of 35 mm at most.

10. The far-optical device according to claim 1, having a central tube disposed between the objective lens and the eyepiece lens and the central tube has a maximum outside diameter of between 35 mm and 30 mm.

* * * * *